April 27, 1943. W. F. WATSON 2,317,835
REEL FOR FISHING LINES
Filed May 28, 1941
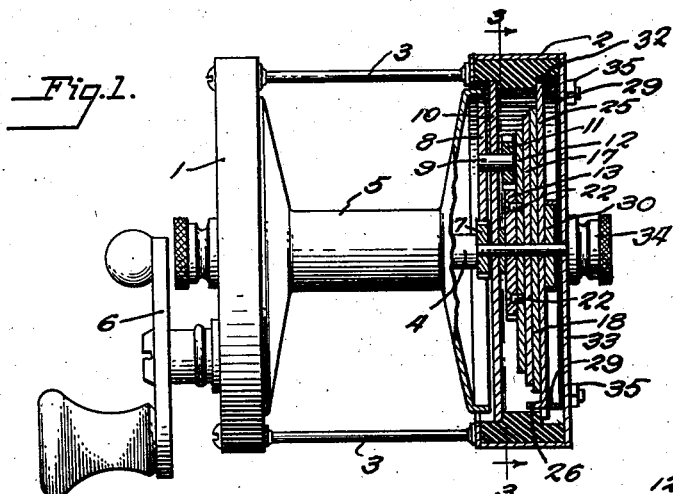
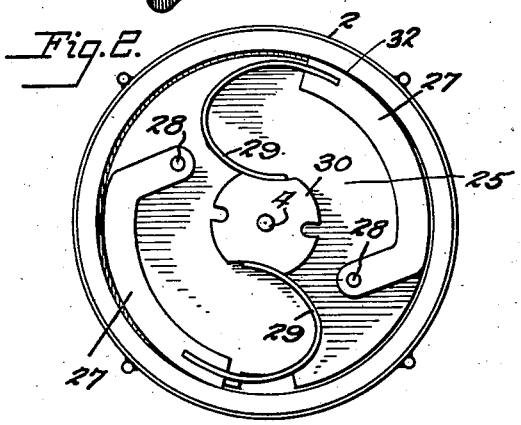
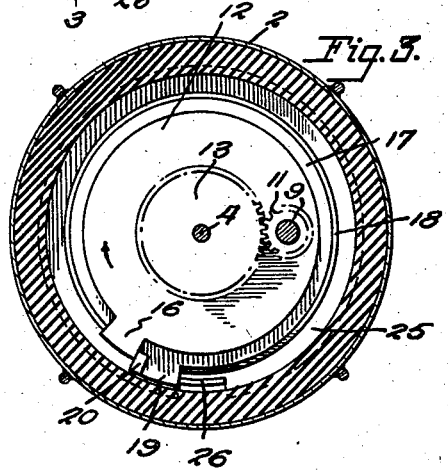
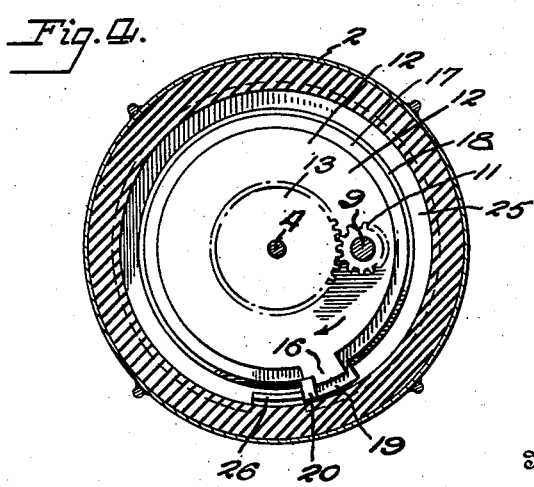
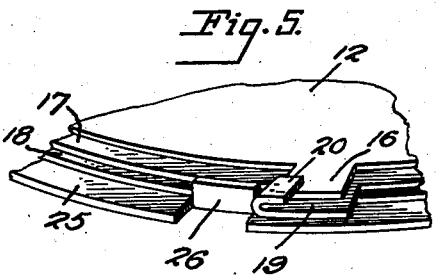
Inventor
W. F. Watson Patented Apr. 27, 1943

2,317,835

UNITED STATES PATENT OFFICE 2,317,835

REEL FOR FISHING LINES

William F. Watson, Bradenton, Fla.

Application May 28, 1941, Serial No. 395,684

4 Claims. (Cl. 242—84.5)

This invention relates to reels for fishing lines and more particularly to a device in such a reel to eliminate back lash from the line in casting while at the same time permitting a free clearance of the line at the beginning of the cast.

In casting the disposition of the line reel overrunning the out-paying line frequently results in vexatious snarls, and the principal object of the present invention is to provide a simple efficient device which will prevent this, but at the same time not impede the initial stages of the cast where it is desirable that the fly or sinker end pay out with maximum freedom.

To accomplish the object applicant has provided an improved and simplified structure by means of which after a predetermined portion of the line has been paid out, a slight retarding or braking of the reel will become operative sufficient to preclude the reel overrunning the line through the remainder and major portion of the cast. This retardation or braking action is very slight so as not to noticeably interfere with the freedom of the reel, but on the other hand is sufficient to prevent such an overrunning.

The invention consists in the novel construction, arrangement and combinations of parts as hereinafter more particularly specified and claimed.

One sheet of drawings accompanies this specification as part thereof in which like reference characters indicate like parts throughout:

Figure 1 is a plan view of a reel partly broken away and shown in cross section;

Figure 2 is an end view of Figure 1 with the right hand cover plate removed;

Figure 3 is a transverse cross section taken on line 3—3 of Figure 1 with the lost motion disks in the position they will occupy at the beginning of a cast;

Figure 4 is a similar cross section taken on line 3—3 showing the lost motion disks in engagement and in position to operate the braking elements; and Figure 5 is a fragmentary perspective of the lost motion disks removed from the reel.

The embodiment of the invention illustrated in the accompanying drawing shows a conventional reel having spaced end housing walls 1 and 2 maintained in proper alignment by the spacer rods 3. A reel shaft 4 is suitably journalled in the housings 1 and 2 and gearing (not shown) is housed in end housing 1 operated by crank 6 to rotate reel shaft 4 and reel 5; all of which structure is conventional.

The present invention is arranged compactly in the right hand end housing 2 through which a reduced portion of reel shaft 4 is extended upon which reduced portion of shaft 4 is fixed a gear 7 meshing with a larger gear 8 associated with a spindle 9 journalled in a disk 10. On the outer end of spindle 9 is secured a second small gear 11 which meshes with a larger gear 13 secured as by small screws 22 to a disk 12, also freely mounted on shaft 4 and having a radially projecting peripheral lug 16. Thus the speed of disk 12 is much less than that of shaft 4.

An intermediate disk 17 is also freely mounted on shaft 4 and provided with a radially projecting peripheral lug 19 having an offset projection 20. A plain spacing disk 18 is next positioned on shaft 4 and outside of this is positioned the brake-carrying disk 25 which is provided with a laterally directed lug 26 adjacent its periphery. On the disk 25 are mounted two arcuate brake shoes 27—27 pivoted thereto as at 28—28, the free ends of these brake shoes being associated with springs 29—29 the free ends of which engage arcuate faces formed on a spacer member 30 whereby the brake shoes 27 are normally tensioned outwardly from the center of the disk to bear against an annular braking surface 32 secured to the end housing 2. Various sized spacer members may be provided with each reel by the selective use of which the tension of the brake shoes may be modified at will. A closure plate 33 is provided and secured on the frame as by nuts 35, the end of the reel shaft being protected as by a knob 34.

Referring to Figures 3 and 4, it will be noted as shown in Figure 3 that at the commencement of the cast the peripheral lug 16 of reel-driven disk 12 is to the left hand side of the peripheral lug 20 of intermediate disk 17 while the laterally directed lug 26 of brake disk 25 is to the right of lug 19. The cast being made the paying out line will rotate reel 5, reel shaft 4 and through gears 7, 8, 11 and 13 will also rotate disk 12 in the direction shown by the arrow until the disk 12 has made substantially a complete revolution whereupon lug 16 will engage lug 20 of intermediate disk 17 and rotate this disk with it a second revolution until the associated lugs 16 and 20 contact lug 26 as shown in Figure 4 and further rotation of the reel will rotate the brake-carrying disk 25, thereby bringing into operation the slight braking friction of shoes 27—27. From that point on the continued paying out of the line and continued rotation of reel 5 will be subject to this slight frictional resistance thus preventing the line overrunning the reel and eliminating back lash from the cast.

At the conclusion of the cast and when the line is rewound, it will be apparent that rotation of reel 5 in the opposite direction will operate to rotate disk 12 in the direction opposite to that shown by the arrow in Figure 4 so that during the initial stages of the wind-up disk 12 will rotate a complete revolution and reengage lug 20 on the left hand side as indicated in Figure 3 and thereafter these two disks will continue to rotate a complete revolution in the counterclockwise direction until lug 19 again contacts the left side of lug 26 as shown in Figure 3 so that during the initial stages of the wind-up the line will be wound in freely and thereafter the disks rotated to the initial starting position ready for another cast.

Various modifications will readily suggest themselves to those skilled in the art, but all within the scope of the present invention as claimed.

Having thus fully described my invention, I claim:

1. In a fishing line reel means for preventing back lash comprising a reel-driven disk, a plurality of pick-up disks and braking means mounted on one of the pick-up disks, with peripherally positioned interengaging members on said disks arranged to engage successively as the reel is rotated.

2. In a fishing line reel means for preventing back lash, comprising a frame carrying an annular brake lining, a disk having a peripheral lug and gear means arranged to drive said disk from the line reel continuously, a brake-carrying disk having means engaging the annular brake lining carried by the reel frame, and having a peripheral lug, and an intermediate disk having a peripheral lug operating as a motion pick-up between said reel-driven disk and brake-carrying disk.

3. A fishing line reel comprising a frame, a reel mounted on a shaft in said frame, means for rotating the reel and reel shaft, an annular brake surface carried by the frame, a brake disk having a peripheral lug freely rotatable on the reel shaft, brake shoes pivoted on said disk and spring means tensioning said shoes against said brake surface, a driving disk having a peripheral lug rotatably mounted on the reel shaft, gear means operatively connecting the reel with said driving disk, and a pick-up disk freely mounted on the reel shaft having a peripheral lug adapted to be engaged by the lug on the driving disk and to engage the lug on the brake disk whereby motion is transmitted belatedly from the driving disk to the brake disk when the reel is rotated in the outfeed direction and said lugs are returned to initial position on rotation of the reel in the intake direction.

4. In a fishing reel, a rotary tensioning device including pivoted brake shoes, spring members attached one to each brake shoe, and a spacer disk having peripheral bearing faces, one for each spring against which the latter bear and means driven by the reel including a lost motion connection for rotating the tensioning device.

WILLIAM F. WATSON.